(12) United States Patent
Diggs

(10) Patent No.: US 9,790,821 B2
(45) Date of Patent: Oct. 17, 2017

(54) HELICAL TORSION VALVE SPRING ASSEMBLY

(71) Applicant: Matthew Byrne Diggs, Farmington, MI (US)

(72) Inventor: Matthew Byrne Diggs, Farmington, MI (US)

(*) Notice: Subject to any disclaimer, the term of this patent is extended or adjusted under 35 U.S.C. 154(b) by 0 days.

(21) Appl. No.: 14/232,889

(22) PCT Filed: Sep. 18, 2013

(86) PCT No.: PCT/US2013/060311
§ 371 (c)(1),
(2) Date: Jan. 14, 2014

(87) PCT Pub. No.: WO2015/020678
PCT Pub. Date: Feb. 12, 2015

(65) Prior Publication Data
US 2016/0201526 A1     Jul. 14, 2016

Related U.S. Application Data

(60) Provisional application No. 61/864,413, filed on Aug. 9, 2013.

(51) Int. Cl.
*F01L 3/10*         (2006.01)
*F16F 1/06*         (2006.01)
(Continued)

(52) U.S. Cl.
CPC ............... *F01L 3/10* (2013.01); *F01L 1/146* (2013.01); *F01L 1/185* (2013.01); *F01L 1/462* (2013.01);
(Continued)

(58) Field of Classification Search
CPC . F01L 1/146; F01L 1/182; F01L 1/185; F01L 1/2405; F01L 1/462;
(Continued)

(56) References Cited

U.S. PATENT DOCUMENTS 1,974,802 A     9/1934  Chilton
3,280,806 A *  10/1966  Iskenderian ............ F01L 1/183
                                                      123/90.47
(Continued)

FOREIGN PATENT DOCUMENTS

CA          655762      1/1963
CH          182801      2/1936
(Continued)

*Primary Examiner* — Mark Laurenzi
*Assistant Examiner* — Paul Thiede
(74) *Attorney, Agent, or Firm* — Peter J. Rashid

(57) ABSTRACT

A helical torsion valve spring assembly includes one or more helical torsion springs mounted within a frame and are held in a statically loaded state so that installation of a valve spring retainer can be easily performed. The entire helical torsion valve spring assembly is installed as a single part onto a cylinder head of an engine valvetrain. The helical torsion springs are mounted around a shaft to accurately locate the helical torsion springs so that the forces acting on the retainer and valve are precisely controlled. The assembly minimizes the size of the retainer, and applies only one bending mode to the helical torsion springs, which provides maximum utilization of the spring material and minimizes coil vibration. The assembly allows spring coils to be strategically packaged in the engine valvetrain to create space in critical areas.

6 Claims, 13 Drawing Sheets

(51) Int. Cl.
  *F16F 3/04* (2006.01)
  *F01L 1/14* (2006.01)
  *F01L 1/18* (2006.01)
  *F01L 1/24* (2006.01)
  *F01L 1/46* (2006.01)
  *F01L 1/053* (2006.01)
  *F01L 1/047* (2006.01)

(52) U.S. Cl.
  CPC .................. *F16F 1/06* (2013.01); *F16F 3/04* (2013.01); *F01L 1/182* (2013.01); *F01L 1/2405* (2013.01); *F01L 2001/0476* (2013.01); *F01L 2001/054* (2013.01); *F01L 2001/0537* (2013.01); *F01L 2105/00* (2013.01)

(58) Field of Classification Search
  CPC ....... F01L 2001/0476; F01L 2001/0537; F01L 2001/054; F01L 2105/00; F01L 3/10; F01L 13/0021; F16F 1/06; F16F 3/04
  USPC ......... 123/90.67, 90.47, 90.16, 90.46, 90.39; 74/559
  See application file for complete search history.

(56) References Cited

U.S. PATENT DOCUMENTS

| | | | | |
|---|---|---|---|---|
| 5,653,198 A | * | 8/1997 | Diggs | F01L 1/185 123/90.16 |
| 6,321,705 B1 | * | 11/2001 | Fernandez | F01L 1/185 123/198 F |
| 6,463,897 B2 | * | 10/2002 | Fernandez | F01L 1/182 123/90.15 |
| 6,502,536 B2 | * | 1/2003 | Lee | F01L 1/185 123/90.16 |
| 7,909,007 B2 | * | 3/2011 | Manther | F01L 1/185 123/90.16 |
| 2010/0275864 A1 | * | 11/2010 | Gemein | F01L 13/0021 123/90.46 |

FOREIGN PATENT DOCUMENTS

| | | |
|---|---|---|
| FR | 532800 | 2/1922 |
| GB | 522998 | 7/1940 |

* cited by examiner

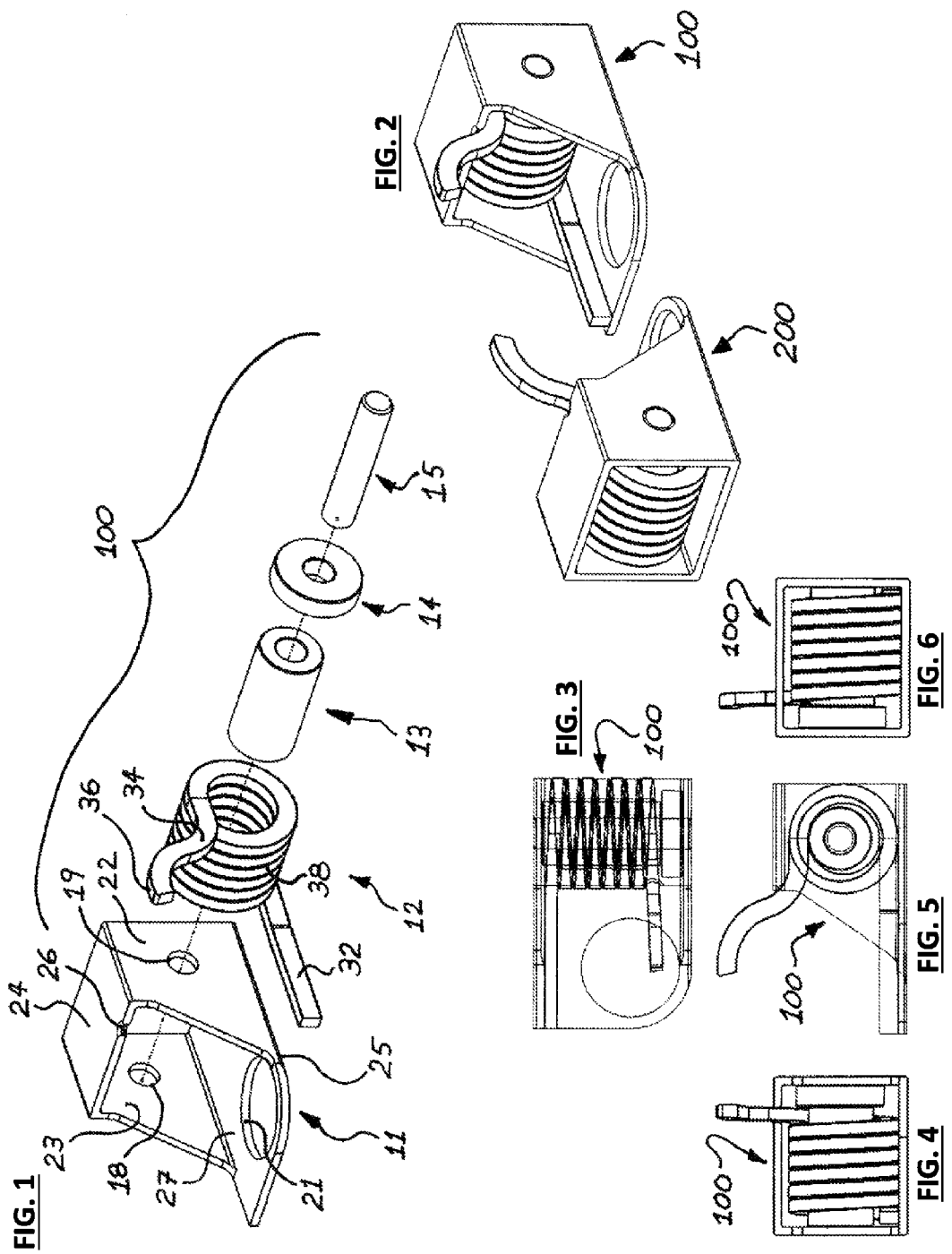

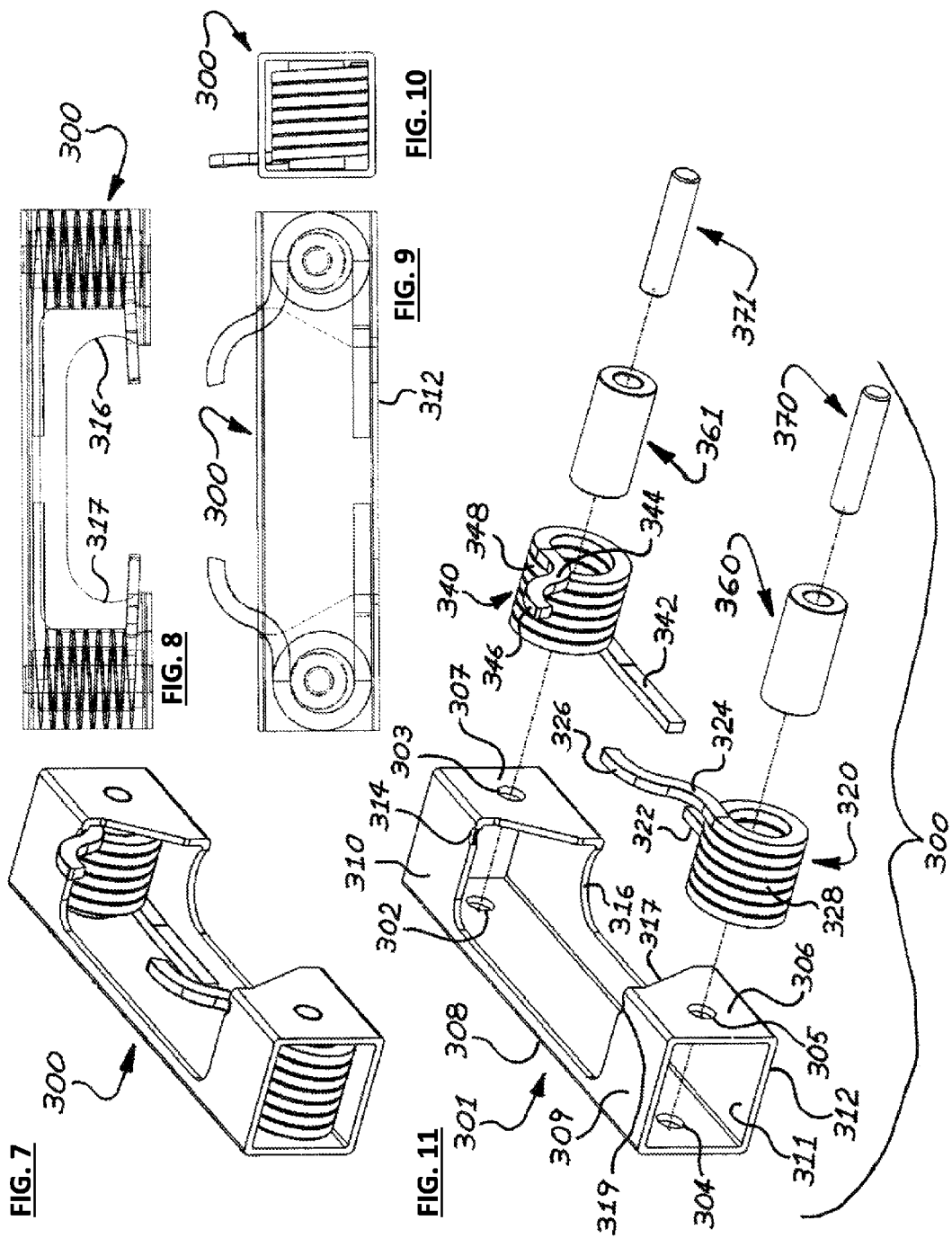

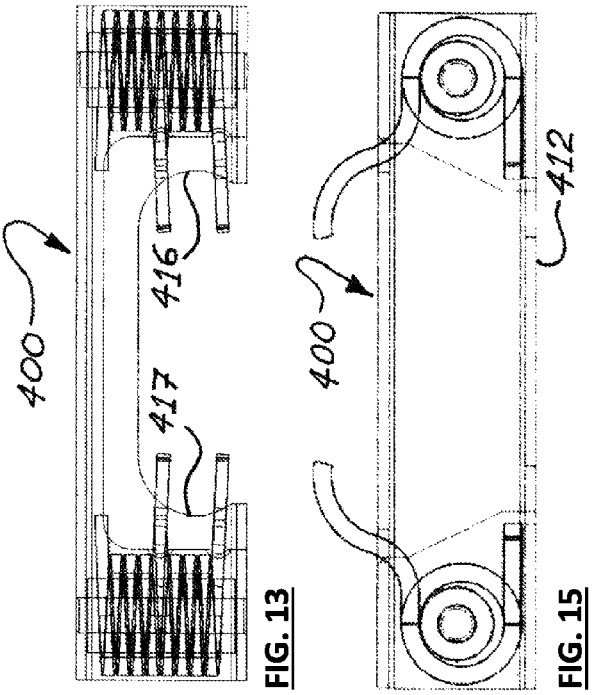
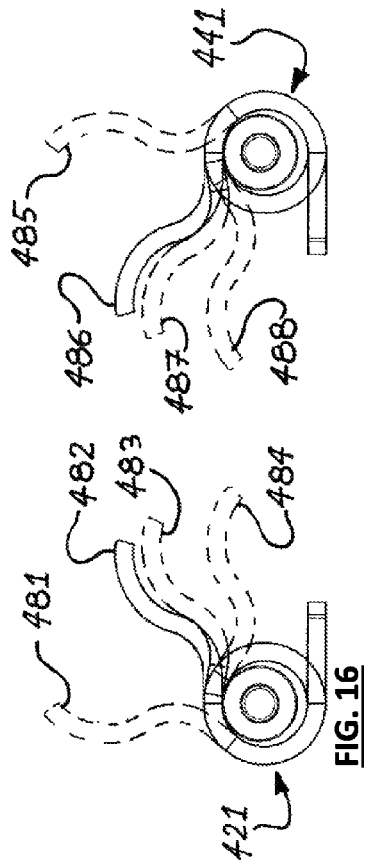
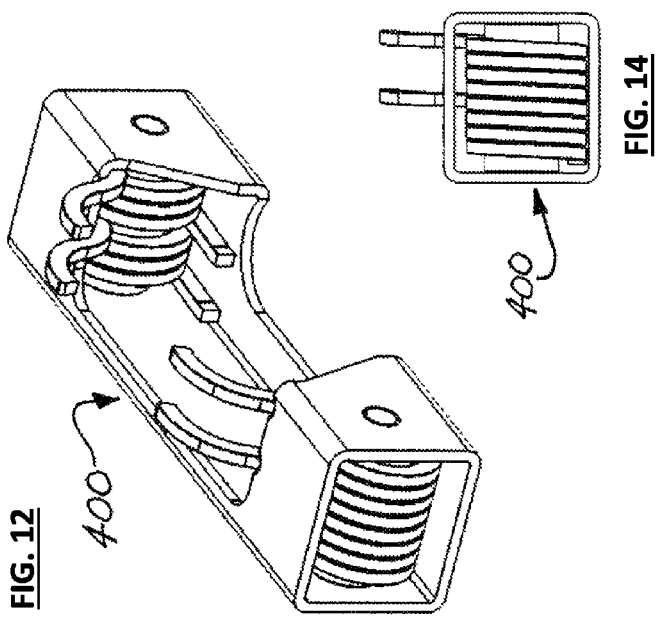

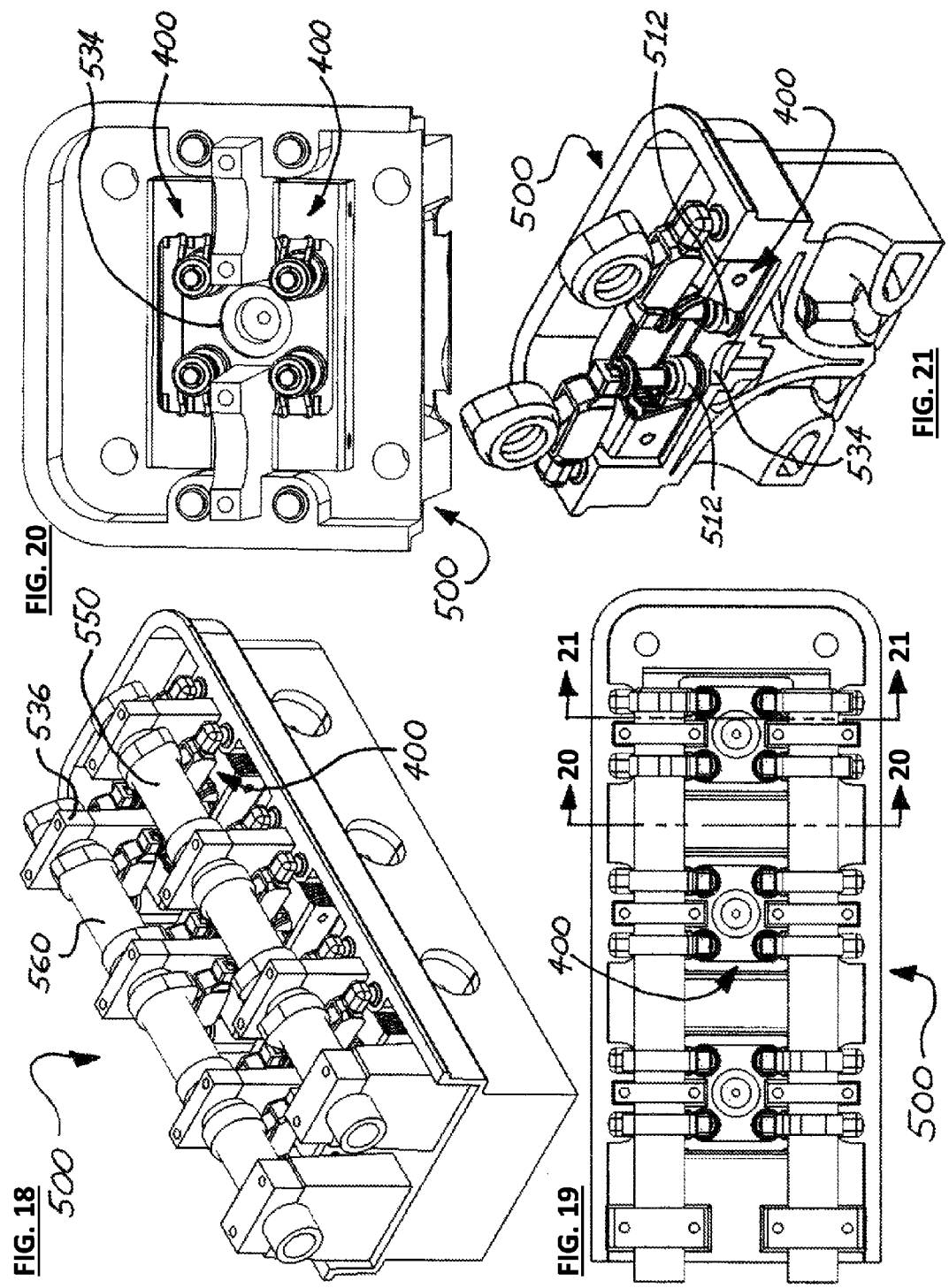

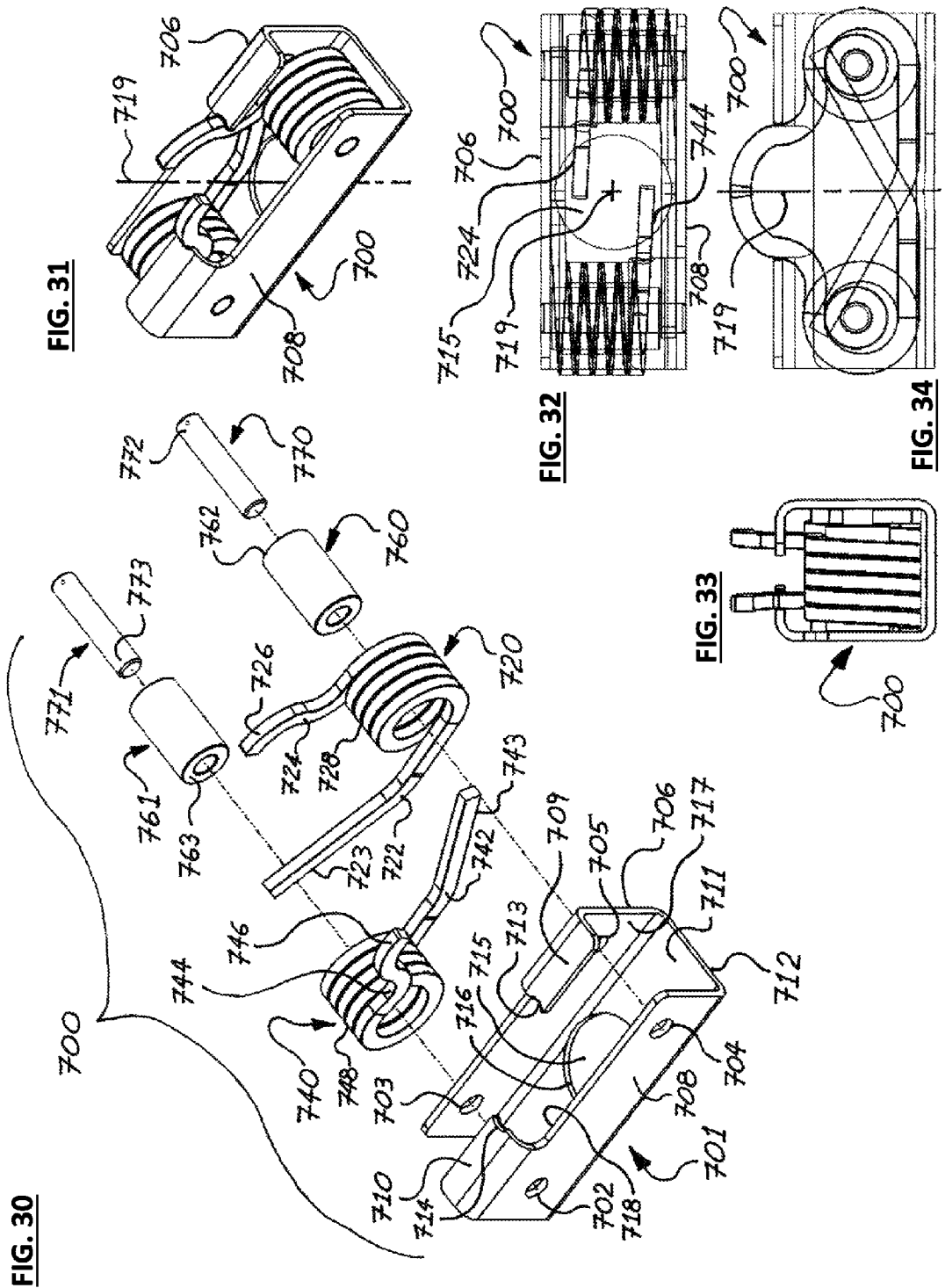

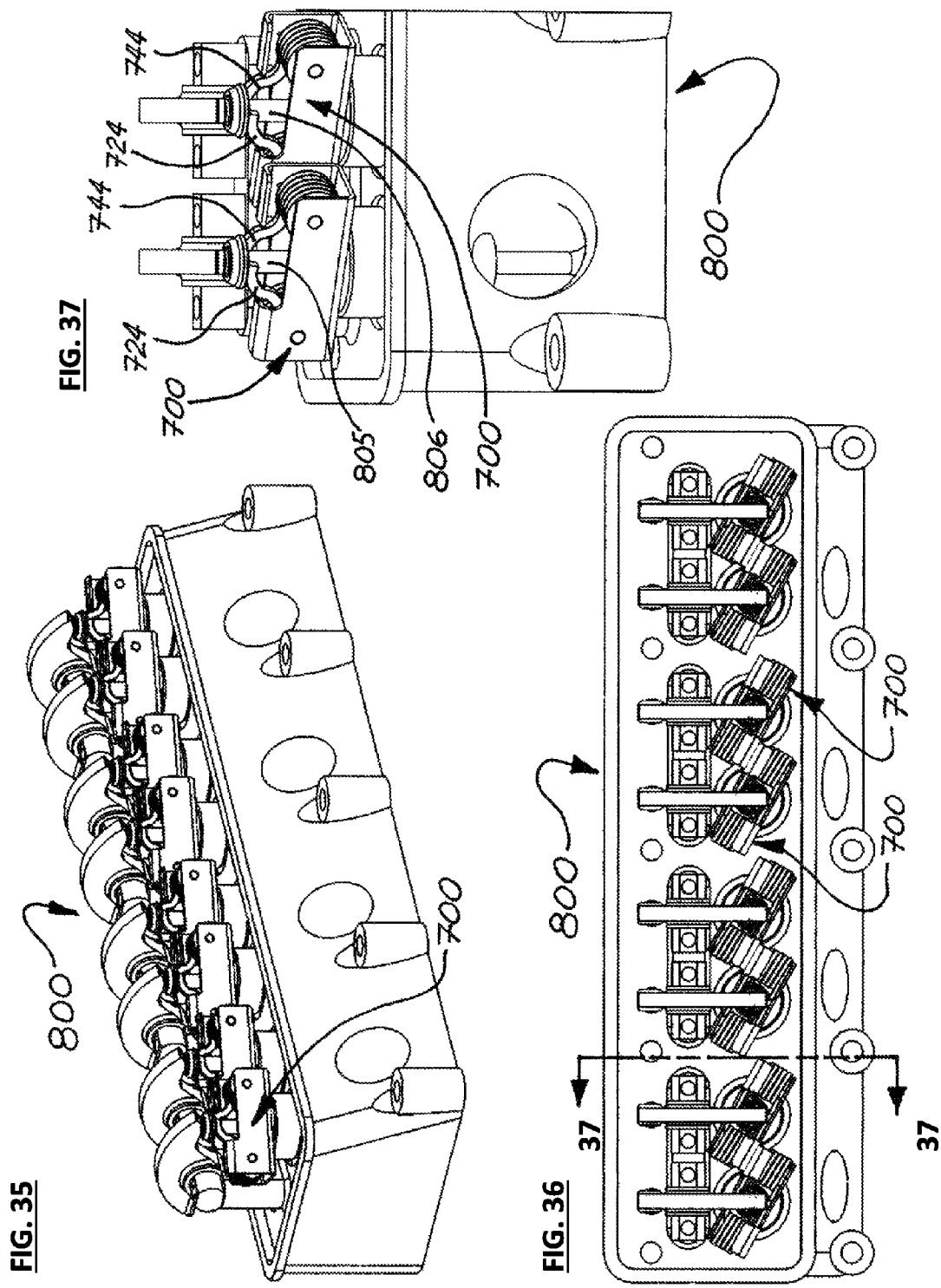

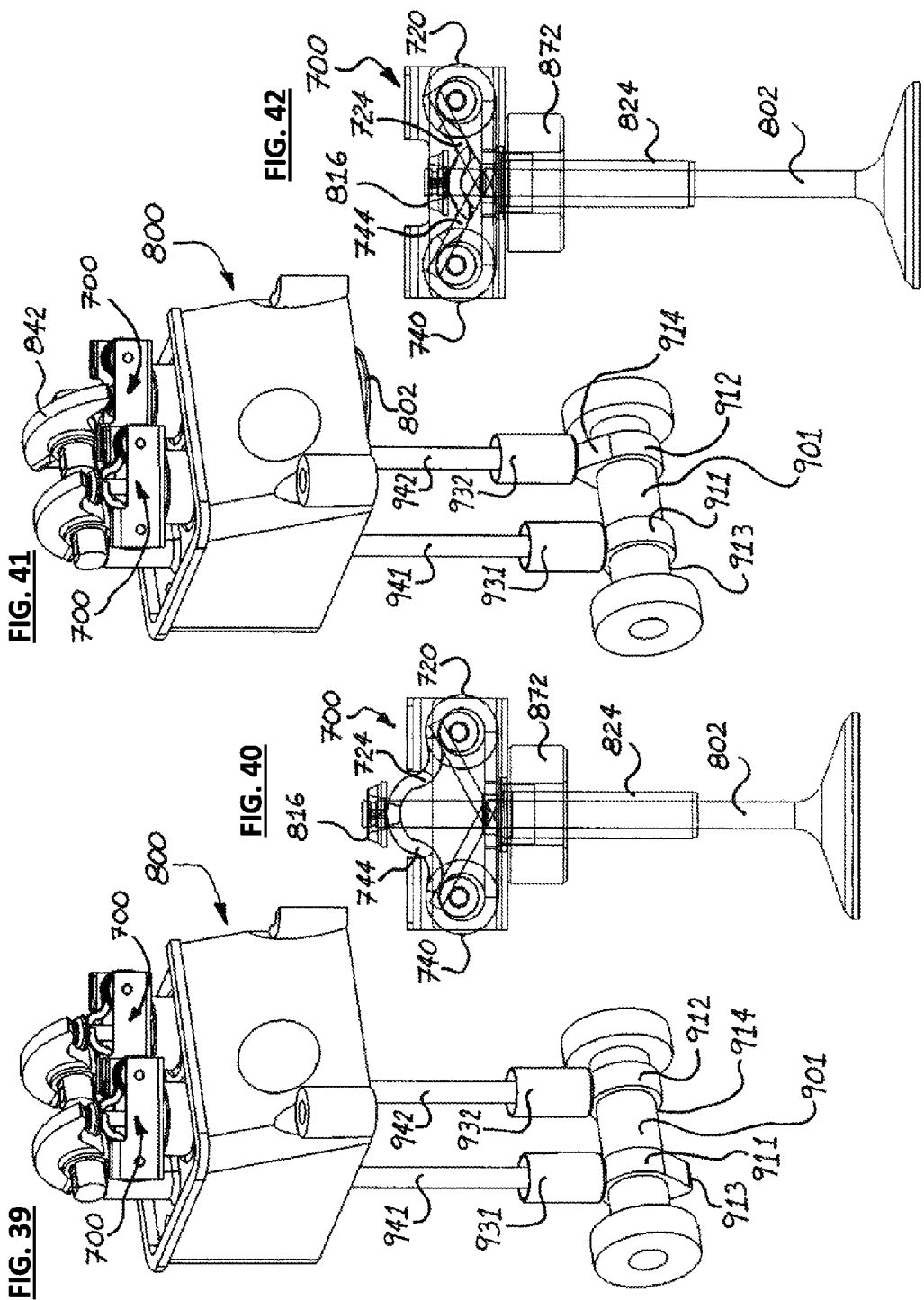

HELICAL TORSION VALVE SPRING ASSEMBLY

BACKGROUND OF THE INVENTION

The invention relates generally to valve return spring arrangements for internal combustion piston engines, fluid pumps and similar machines.

The most commonly-used method for valve return springs in internal combustion piston engines today is the helical compression spring which is coupled to the valve at one end and is stationary at the other end, and is coaxial with the valve axis.

This method, while providing the basic function of springing the valve mechanism, is known to have undesirable characteristics that can compromise the valvetrain system function and ultimately the total engine function. One compromise that has been well-studied is the tendency for destructive coil surges that tends to increase as engine RPMs increase. The active coil of the helical-compression-type valve spring is often found to have too-low a natural frequency relative to the valve actuation frequency which is equal to the camshaft speed and is ½ of the engine operating speed for a 4-stroke engine. Coil surge is unwanted vibration of the active coil of a spring that causes cyclic increases and decreases in the forces that the spring is intended to produce and results in several problems: 1) higher fatigue stresses in the spring which requires the spring designer to adjust the nominal stresses downwards by using a heavier wire which tends to lower the coil frequency further and compounds the problem; 2) a coil surge away from the valve spring retainer during the valve lift event causes a lapse of force that may result in separation and violent re-engagement of the cam and follower that results in damage to the engine; 3) a coil surge away from the valve spring retainer at the end of a valve lift event causes a lapse in force that may result in valve bounce which can cause an undesirable exchange of air into or out of the cylinder that compromises engine performance; 4) a coil surge towards the valve spring retainer during the valve lift event may cause higher loading at the cam/follower interface and higher torsional loading for the camshaft timing drive system which exacerbates fatigue and wear of other engine components and necessitates the use of heavier more-expensive components. The problem of coil surge has been dealt with in several ways, including: 1) reducing the valve lift to reduce the spring force requirement which enables a higher frequency spring design, but may compromise engine performance; 2) using multiple concentric spring arrays to raise the coil frequency of the valve spring but increases the outside package diameter and requires use of a heavier valve spring retainer which increases the cost of the engine; 3) incorporating a spring damper to frictionally inhibit coil surge, or having concentric springs which interfere with each other to cause frictional damping—either of these may cause wear of the spring that may result in failure.

Another consideration for a valve spring may be the size and location of the spring package as it relates to other essential components in the engine cylinder head such as a spark plug, a direct-injection fuel injector or other features such as camshaft bearing structures and cylinder head bolt seats. The helical-compression-type valve spring, as it is applied almost universally, is concentric with the valve. Hence, the radial package around a valve axis in the upper part of a cylinder head is the outside radius of the valve spring which in some instances can lead to a compromise. In modern diesel engines, for example, it is often preferred to have the fuel injector in the center of a four-valve array with all four valves being parallel with the cylinder bore axis. However, for smaller cylinder bore diameters, due to the proximity of the helical-compression-type valve springs with the fuel injector, the four-valve array must be splayed outwards such that the valves are not parallel with the cylinder bore axis in order to obtain the necessary clearance between the fuel injector and the valve springs resulting in a compromised combustion chamber.

SUMMARY OF THE INVENTION

The helical torsion valve spring is another valve return spring arrangement that has been used in engines. As it has been typically applied, the axis of the spring coil is offset from the valve axis and lies on a plane that is perpendicular to the valve axis. The moving leg of one or more helical torsion springs contacts a retainer that is fastened to the valve and applies force to bias the valve to a closed position. The advantages of the helical torsion valve spring over the helical-compression-type valve spring are: 1) for a given set of parameters—valve-closed force, valve-open force, valve lift—there is a capability for higher spring coil natural frequency to reduce or eliminate the problem of coil surge; 2) reduced effective reciprocating mass at the valve; and 3) the ability to package spring coils in a chosen radial direction away from the valve axis thereby leaving more space in another radial direction to effectively make room for another component or design feature.

Regarding advantage (1), for having higher spring coil natural frequency—this is due to the helical torsion valve spring having a shorter and stiffer coil than can practically be done with a helical-compression-type valve spring. The moving leg of the helical torsion spring couples the spring coil to the valve spring retainer with a leverage effect such that the force at the coil is greater than the force at the valve, but the stroke is less. Hence, the helical torsion valve spring can have a shorter-stiffer coil than a comparable helical-compression-type valve spring which is direct-coupled to the valve necessitating a longer-stroking/lower-stiffness coil, by comparison. Holding the energy storage capacity constant, shorter-stiffer spring coils tend to have higher natural frequencies. This effect is dominant over the helical compression spring coil, which is primarily loaded in torsion, being approximately 20% more stress-efficient than a rectangular-wire helical torsion spring coil, which is primarily loaded in bending ("stress-efficiency" is the ratio of average stress to maximum stress in a loaded coil). In many cases studied for applications including diesel engines and high-speed gasoline engines, it has been found that the coil frequencies for helical torsion valve springs can be made high enough to practically eliminate the problem of coil surge in the running engine that is liable to occur using helical-compression-type valve springs.

A further benefit of the higher-coil-frequency tendency of helical torsion springs is the capability for lower spring rates such that, while maintaining a sufficient amount of force at the valve-closed position, the forces acting on the valve during the valve lift event can be reduced such that the overall valvetrain friction is reduced which allows the engine to operate with lower rates of fuel consumption. This capability applies mostly to turbocharged engines because the valve-closed force requirement is higher due to higher manifold pressures while the peak force requirement is lower because the maximum RPM is typically lower for turbocharged engines compared to naturally aspirated engines. Many turbo-diesel engines today operate with excessive amounts of spring force during a valve lift event due to helical-compression-type valve springs lacking a capability for lower spring rates.

Regarding advantage (2), for having reduced effective mass at the valve—this is due to having the coil offset from the valve which reduces the moving velocity in the coil by a ratio that is approximately the coil radius divided by the distance from the coil axis to the valve axis—a ratio that is typically ⅓ to ½. The fraction of coil mass that is effective at the valve is this ratio squared and divided by three. The helical-compression-type valve spring that is direct-coupled to the valve, by comparison, has a ratio that is always one. Hence, the helical torsion spring is more than 75% lower effective mass at the valve for many cases studied. This advantage is bolstered by the ability to couple the moving spring leg to the valve spring retainer close to the valve stem enabling the retainer to be smaller and lighter than those typically used with helical-compression-type valve springs. Reducing the moving mass in a valvetrain system is known to provide capability for increasing the operating speed of the valvetrain system and/or increasing the area under the valve lift curve—both of these improvements may allow for improved engine performance.

Regarding advantage (3), the packaging advantage—the graphics contained in this application demonstrate that the helical torsion valve spring can be used to advantage to create increased space for critical systems in the engine by strategic placement of spring coils away from critical areas in a cylinder head. For example, in a modern diesel engine having four-valves-per-cylinder, a significant increase in package space for the D.I. fuel injector is achievable.

In summary, the helical torsion valve spring can reduce or practically eliminate coil surge and the problems associated with it while also reducing the reciprocating mass in the valve gear to provide an engine builder with the ability to improve engine function with regards to performance. There is also potential for improved packaging of critical components in the cylinder head such as a D.I. fuel injector.

The invention is directed to a helical torsion valve spring assembly having the following features: 1) provides all of the advantages of helical torsion valve springs for reducing coil surge and for reducing the effective reciprocating mass of the valve gear mechanism; 2) an engine builder can install the helical torsion valve spring assembly onto a cylinder head of an engine as a single unit, the same as one would install a helical-compression-type valve spring; 3) enables a safe, easy process for installation of a valve spring retainer using a single straight-line motion. This is achieved by having the moving leg(s) of the helical torsion spring(s) precisely held in a statically loaded state to allow a retainer to be placed directly around the valve stem and engage the torsion spring moving leg(s); 4) the helical torsion valve spring assembly is secured in the engine by the forces acting on the helical torsion springs and the reaction forces acting on the frame, without the need of any fasteners; 5) helical torsion springs are precisely mounted on a shaft; 6) the frame protects the outer surfaces of the spring coils which are the highest stressed surfaces of a helical torsion spring; and 7) provides capability for strategic packaging of spring coils to create space in critical areas of an engine.

A feature of the preferred embodiment is to have the helical torsion spring(s) mounted on a shaft or bushing to: a) accurately locate the spring to provide precise control the forces acting on the retainer and valve; b) to help minimize the size required for the valve spring retainer; c) to provide maximum utilization of the spring material by ensuring that a single mode of bending load is applied to the spring coil; and d) to help minimize vibration by limiting movement of the spring coil.

Another consideration for using a helical torsion spring for springing a valve is the method used to couple the torsion spring moving leg, which has rotary motion, with the engine valve which moves in a linear motion. A preferred embodiment of the invention is to use rectangular spring wire for the helical torsion spring which provides the highest stress-efficiency, and having a convex surface formed into the moving leg of the helical torsion spring. The convex surface contacts a flat surface of a valve spring retainer that is fastened to the valve, with the flat surface being perpendicular to the axis of the valve. The convex surface of the moving leg and the flat surface of the retainer remain in contact during the entire valve lift event such that there is always line contact at the interface to ensure that contact pressures are at acceptable levels. The normal force transmitted into the retainer biases the valve to the closed position, and frictionally-induced forces in the transverse direction can be absorbed by the valve stem/valve guide interface.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is an exploded view of a helical torsion valve spring assembly having a single helical torsion spring for applying a biasing force to a single valve of an engine valvetrain according to an embodiment of the invention;

FIG. 2 is an isometric view of the assembly of FIG. 1 and another helical torsion valve spring assembly that is the mirror-image of the assembly of FIG. 1;

FIG. 3 is a top-hidden-line view of the assembly of FIG. 1;

FIG. 4 is a front view of the assembly of FIG. 1;

FIG. 5 is a side-hidden-line view of the assembly of FIG. 1;

FIG. 6 is a rear view of the assembly of FIG. 1;

FIG. 7 is an isometric view of a helical torsion valve spring assembly having two helical torsion springs with each spring intended for applying a biasing force to a single valve of an engine valvetrain according to an embodiment of the invention;

FIG. 8 is a top-hidden-line view of the assembly of FIG. 7;

FIG. 9 is a side-hidden-line view of the assembly of FIG. 7;

FIG. 10 is an end view of the assembly of FIG. 7;

FIG. 11 is an exploded view of the assembly of FIG. 7;

FIG. 12 is an isometric view of a helical torsion valve spring assembly having two pairs of helical torsion springs with each pair of springs intended for applying a biasing force to a single valve of an engine valvetrain according to an embodiment of the invention;

FIG. 13 is a top-hidden-line view of the assembly of FIG. 12;

FIG. 14 is an end view of the assembly of FIG. 12;

FIG. 15 is side-hidden-line view of the assembly of FIG. 12;

FIG. 16 is a side view showing two helical torsion springs of the assembly of FIG. 12 in four different states of loading: free state, statically loaded state, valve-closed state, valve-open state;

FIG. 18 is an isometric view of an engine valvetrain including six of the helical torsion valve spring assemblies of FIG. 12;

FIG. 19 is a top view of the engine valvetrain of FIG. 18;

FIG. 20 is an isometric cross-sectional view of the engine valvetrain taken along line 20-20 of FIG. 19 with the camshafts and bearing caps removed for clarity;

FIG. 21 is an isometric sectional view of the engine valvetrain taken along line 21-21 of FIG. 19;

FIG. 30 is an exploded view of a helical torsion valve spring assembly having a spring mounted on both ends of the frame with the pair of springs intended for applying a biasing force to a single valve;

FIG. 31 is an isometric view of the assembly of FIG. 30;

FIG. 32 is a top-hidden-line view of the assembly of FIG. 30;

FIG. 33 is an end view of the assembly of FIG. 30;

FIG. 34 is a side-hidden-line view of the assembly of FIG. 30;

FIG. 35 is an isometric view of an engine valvetrain for a pushrod-type valvetrain including eight helical torsion valve spring assemblies of FIG. 30;

FIG. 36 is a top view of the engine valvetrain of FIG. 35;

FIG. 37 is an enlarged cross-sectional view of the engine valvetrain taken along line 37-37 of FIG. 36;

FIG. 39 is an isometric cross-sectional view of the engine valvetrain taken along line 37-37 of FIG. 36 and also includes lower valvetrain components to show both the exhaust and intake valves being closed;

FIG. 40 is a partial-side-hidden-line cross-sectional view of the engine valvetrain of FIG. 39 showing the intake valve closed;

FIG. 41 is another isometric cross-sectional view of the engine valvetrain of FIG. 39, except showing the intake valve being open; and FIG. 42 is a partial-side-hidden-line cross-sectional view of the engine valvetrain of FIG. 41 showing the intake valve open.

DETAILED DESCRIPTION OF THE INVENTION

Figure 17:
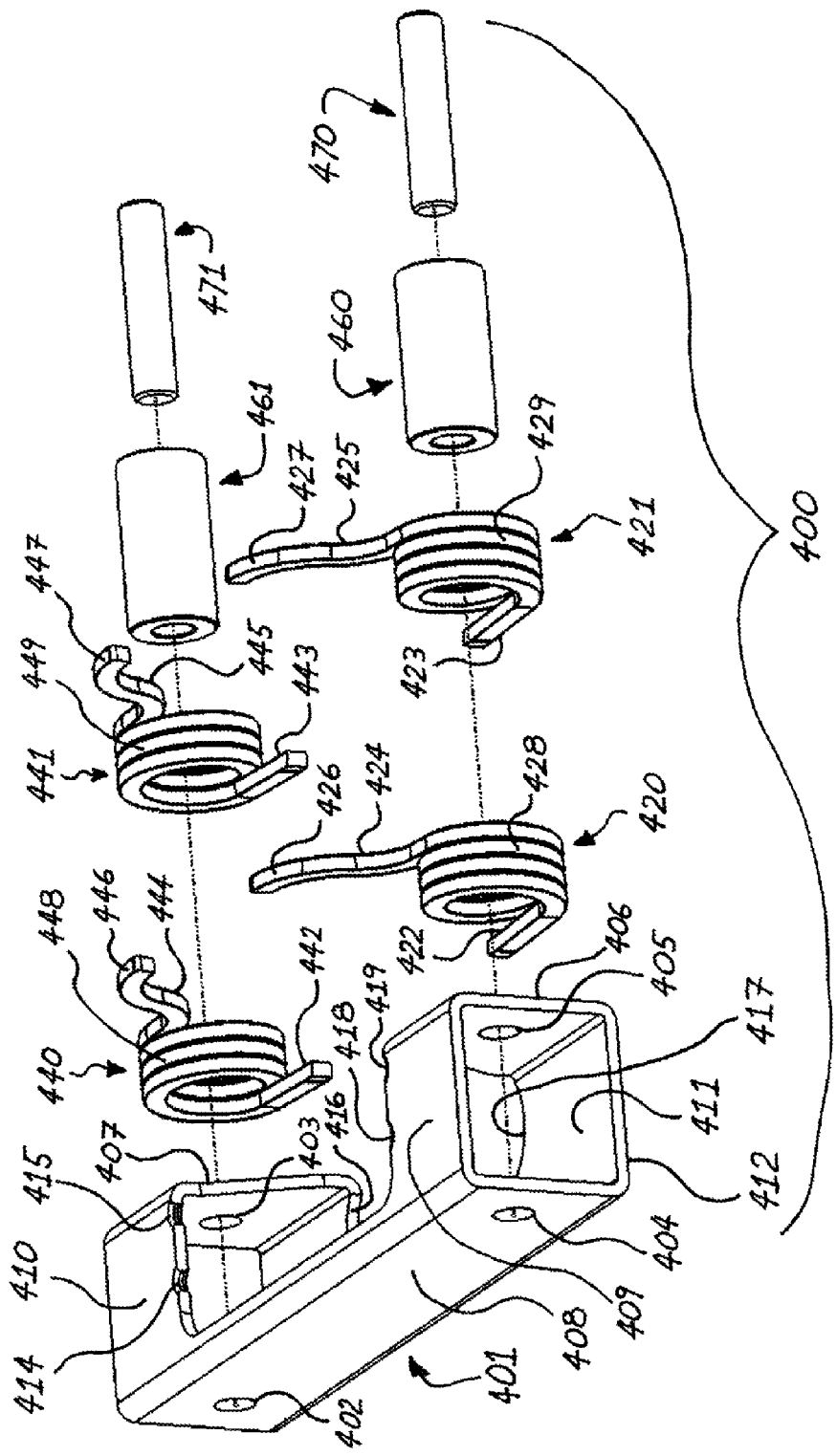
FIG. 17 is an exploded view of the assembly of FIG. 12.

Referring now to FIGS. 1 through 6, a helical torsion valve spring assembly 100 having a helical torsion spring 12 which is intended for applying a biasing force to a valve is shown according to an embodiment of the invention. As shown in FIG. 1, the assembly 100 includes a frame 11, which can be machined from rectangular tubing using conventional manufacturing processes. The frame 11 includes a pair of opposing side walls 22, 23, each of which connects to a top wall 24 and a bottom wall 27, and each of which has a hole 19, 18. The holes 19, 18 interface with shaft 15 around which bushing 13 and spacer 14 are coaxially mounted, and with helical torsion spring 12 surrounding bushing 13, all of which are captured inside the frame 11. The shaft 15 can be secured by an interference fit with holes 19, 18. The spacer 14 separates the helical torsion spring 12 and bushing 13 from side wall 22. The helical torsion spring 12 has a coil 38, a stationary leg 32, which contacts the bottom wall 27 of the frame 11, and a moving leg 34, which contacts the top wall 24 of the frame 11. One advantage of the invention is that the moving leg 34 contacts a spring contact surface 26 on the top wall 24 such that the helical torsion spring 12 is precisely held within the frame 11 in a statically loaded state to enhance the installation process of a valve spring retainer of an engine valvetrain. In the illustrated embodiment, spring contact surface 26 is in the form of a notch, and the like, that holds moving leg 34 of helical torsion spring 12 to provide a precise relationship of moving leg 34 and locating feature 21 to aid the installation of the assembly 100 into an engine valvetrain. The locating feature 21 interfaces with a conformal feature of a cylinder head. The seating surface 25 which is the underside of bottom wall 27 contacts a surface of a cylinder head during use, as described in more detail below. The moving leg 34 has a convex surface 36 that contacts a flat surface of a valve spring retainer to apply a biasing force to a valve during use, as described in more detail below. The frame 11 protects the coil 38, which is highly-stressed during use. It can also be realized that the end of the frame 11 can be covered by an additional part to provide further protection for the coil 38.

FIG. 2 shows a pair of helical torsion spring assemblies 100, 200, which are mirror images of each other. FIGS. 3-6 show four views of the helical torsion valve spring assembly 100: FIG. 3 is a top-hidden-line view, FIG. 4 is a front view, FIG. 5 is a side-hidden-line view, and FIG. 6 is a rear view. It can be seen from FIGS. 3-6 that the application of force to the convex surface 36 of the helical torsion spring 12 cannot cause the helical torsion valve spring assembly 100 to tip over. Furthermore, any undesirable sideways motion can be prevented by having locating feature 21 in the bottom wall 27 of the frame 11 disposed about a suitable feature of the cylinder head (not shown) having a complimentary shape.

Referring now to FIGS. 7 through 11, a helical torsion valve spring assembly 300 having two helical torsion springs 320, 340 with each spring intended for applying a biasing force to a single valve of an engine valvetrain is shown according to another embodiment of the invention. FIG. 11 shows details, including a frame 301, which can be machined from rectangular tubing using conventional manufacturing processes. The frame 301 includes a side wall 308 which connects to top walls 309, 310 which each connect to a side wall 306, 307 each of which are opposite side wall 308. A bottom wall 311 connects to side walls 306, 307, 308. Spring contact surfaces 319, 314, in the form of notches, and the like, are located on the top walls 309, 310. Bottom wall 311 has a seating surface 312, also shown in FIG. 9, on the underside and two locating features 316, 317 which are also shown in FIG. 8.

Opposing walls 308-306 have a pair of holes 304-305, and opposing walls 308-307 have a pair of holes 302-303 with each pair of holes 304-305, 302-303 interfacing with a shaft 370, 371. A helical torsion spring 320, 340 surrounding a bushing 360, 361 surrounds each shaft 370, 371, all of which are captured inside the frame 301. The shafts 370, 371 can be secured by an interference fit with the holes 304-305, 302-303.

Each helical torsion spring 320, 340 has a coil 328, 348, a stationary leg 322, 342 which contacts the bottom wall 311 of the frame 301, and a moving leg 324, 344 which contacts a spring contact surface 319, 314 of the frame 301 such that the helical torsion springs 320, 340 are precisely held in the frame 301 in a statically loaded state to enhance the installation process of a valve spring retainer 516, 515 of an engine valvetrain 500, as will be discussed in greater detail. A further benefit is to provide a precise relationship of the moving legs 324, 344 to locating features 316, 317 to aid the installation of the assembly 300 onto a cylinder head and valvetrain. The moving leg 324, 344 of each helical torsion spring 320, 340 has a convex surface 326, 346 that contacts a flat surface of a valve spring retainer during use, as will be described in more detail. The frame 301 protects the coils 328, 348, which are highly-stressed during use. It can also be realized that each end of frame 301 can be covered by an additional part to provide further protection.

Referring now to FIGS. 12 through 17, a helical torsion valve spring assembly 400 including two pairs of helical torsion springs 440-441; 420-421, each of which is intended for applying a biasing force to a valve of an engine valvetrain, is shown according to another embodiment of the invention. FIG. 17 shows details, including the frame 401, which can be machined from rectangular tubing using conventional manufacturing processes. The frame 401 includes a side wall 408 which connects to top walls 409, 410 each of which connects to a side wall 406, 407 which is opposite side wall 408. A bottom wall 411 connects to side walls 406, 407, 408. Spring contact surfaces 418-419, 414-415, in the form of notches, and the like, are located on the top walls 409, 410. Bottom wall 411 has a seating surface 412 on the underside, also shown in FIG. 15, and two locating features 416, 417 which are also shown in FIG. 13.

Opposing walls 408-406 have a pair of holes 404-405, and opposing walls 408-407 have a pair of holes 402-403 with each pair of holes 404-405, 402-403 interfacing with a shaft 470, 471. A pair of helical torsion springs 420-421, 440-441 surrounding a bushing 460, 461 surrounds each shaft 470, 471, all of which are captured inside the frame 401. The shafts 470, 471 can be secured by an interference fit with the holes 404-405, 402-403.

Each helical torsion spring 420, 421, 440, 441 has a coil 428, 429, 448, 449, a stationary leg 422, 423, 442, 443 which contacts bottom wall 411 of frame 401, and a moving leg 424, 425, 444, 445, which contacts a spring contact surface 418, 419, 414, 415 of the frame 401 such that the helical torsion springs 420, 421, 440, 441 are precisely held in frame 401 in a statically loaded state 482, 486 as shown in FIG. 16 and described in detail below to enhance the installation process of a valve spring retainer 515, 516 of an engine valvetrain 500, as described in FIGS. 18-29. A further benefit is to provide a precise relationship of the moving legs 424, 425, 444, 445 to locating features 416, 417 to aid the installation of the assembly 400 into an engine valvetrain 500 (referring to FIGS. 18-21). The moving legs 424, 425, 444, 445 of each helical torsion spring 420, 421, 440, 441 have convex surfaces 426, 427, 446, 447 which contact a flat surface 536, 535 of a valve spring retainer 516, 515 during use, as described in more detail in FIGS. 22-29 below. The frame 401 protects the coils 428, 429, 448, 449, which are highly-stressed during use. It can also be realized that each end of frame 401 can be covered by an additional part to provide further protection.

FIG. 16 shows helical torsion springs 421, 441 in each of four states of loading. Listed in order of the magnitude of loading from zero to highest: a) a free state 481, 485, which is a "zero-load" condition; b) a statically loaded state 482, 486 as the springs 421, 441 are held in place in the helical torsion valve spring assembly 400; c) a valve-closed state 483, 487; and d) a valve-open state 484, 488. As used herein, a "statically loaded state" is defined as the state 482, 486 in which a moving leg 425, 445 of a helical torsion spring 421, 441 contacts the spring contact surface 419, 415 of the frame 401. It will be appreciated that the "statically loaded state" as discussed for the helical torsion valve spring assembly 400 applies to all helical torsion valve spring assemblies discussed herein. It will also be appreciated that the statically loaded state 482, 486 as discussed for helical torsion springs 421, 441 applies to all helical torsion springs discussed herein.

For the helical torsion valve spring assembly 400, having the helical torsion spring pairs 420-421, 440-441 mounted on bushings 460, 461 provides precise location, and insures that there is only one mode of bending load applied to the coils 428, 429, 448, 449. This is the most efficient use of the spring material and helps to achieve higher coil frequency, and causes rotary motion of the moving legs 424, 425, 444, 445 about the center of the bushing so that the movement of the convex surfaces 426, 427, 446, 447 is a controlled precision motion in relation to locating features 416, 417 and seating surface 412 of frame 401 so as to help minimize the size required for the valve spring retainer 515, 516. It will be appreciated that this relationship as discussed for helical torsion valve spring assembly 400 applies to all helical torsion valve spring assemblies 100, 200, 300, 400, 700 described herein. It can also be realized that while frames 11, 301, 401 can be machined from rectangular tubing, a similar structure can be manufactured from stamped metal by using a design similar to frame 701 which is shown in FIGS. 30-34. One can also realize that while stationary legs 422-423, 442-443 of helical torsion springs 420-421, 440-441 are shown contacting bottom wall 411, the same essential result can be achieved by having stationary legs 422-423, 442-443 contact a top wall 409, 410. This principle applies to all helical torsion valve spring assemblies 100, 200, 300, 400, 700 discussed herein.

Referring now to FIGS. 18 and 19, an engine valvetrain 500 is shown according to an embodiment of the invention. In the illustrative embodiment, the engine valvetrain 500 is typical of a modern automotive diesel engine, except that in place of the conventional helical-compression-type valve springs, the engine valvetrain 500 incorporates a plurality of helical torsion valve spring assemblies 400. FIG. 20 is a cross-sectional view of a single-cylinder of the engine valvetrain 500 of FIG. 19 and having the camshafts 550, 560 and bearing caps 536 removed to reveal the mounting hole 534 for a fuel injector not shown and two helical torsion valve spring assemblies 400. However, it will be appreciated by one skilled in the art that the invention is not limited by the number of helical torsion valve spring assemblies 400 that are included in the engine valvetrain 500, and the invention can be practiced with any desirable number of helical torsion valve spring assemblies 400.

FIG. 21 is an isometric sectional view of the engine valvetrain taken along line 21-21 of FIG. 19.

FIGS. 20 and 21 reveal that the spring coils 428, 429, 448, 449 of the helical torsion valve spring assemblies 400 are packaged away from the fuel injector hole 534. It can be appreciated by one skilled in the art that using helical-compression-type valve springs that are concentric to the valves 501, 502 and surround valve stem seals 512 shown in FIGS. 21 and 22, as they are typically utilized, would result in having less space for the fuel injector mounting hole 534 in the center of the cylinder.

Figure 22:
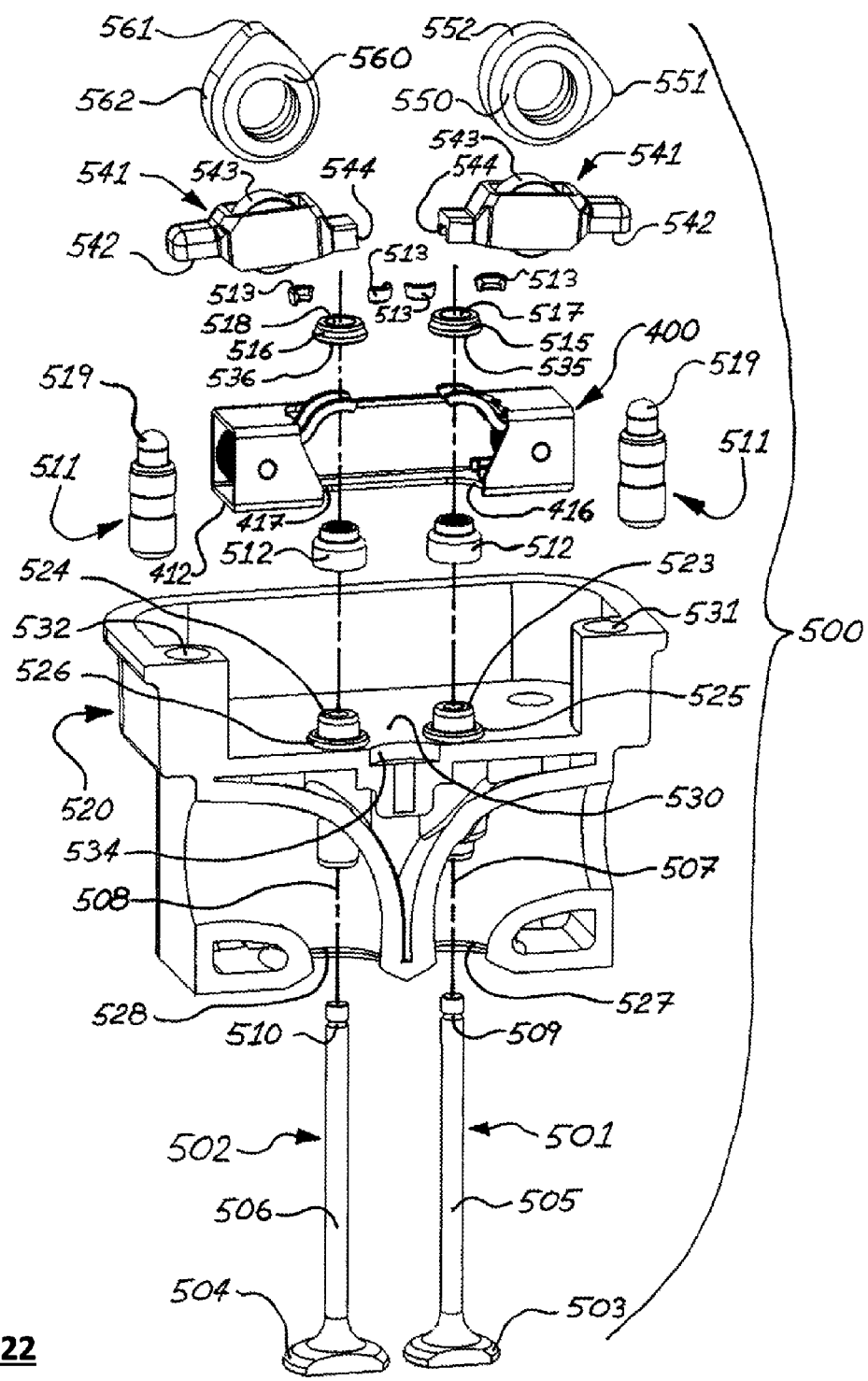
FIG. 22 is an exploded view of FIG. 21.

FIG. 22 is an exploded view of the cross-sectional view of FIG. 21 revealing a cylinder head 520, an exhaust valve 501 and intake valve 502 each of which have a seat face 503, 504, a stem 505, 506, a keeper groove 509, 510 and an axis 507, 508 and are coaxially mounted in valve guides 523, 524 of the cylinder head 520. A valve stem seal 512 is coaxially mounted on each valve guide 523, 524 and contacts a valve stem 505, 506. A lash adjuster 511 is captured in each mounting hole 531, 532 of the cylinder head 520, each having a spherical bearing surface 519 which interfaces with a spherical socket 542 of a roller finger follower 541, which has a roller 543 and a valve tip pad 544 that contacts a valve 501, 502. An exhaust camshaft 550 and an intake camshaft 560 each have cam lobes 551, 561 and base circles 552, 562 that interface with a roller 543 to transmit force through a roller finger follower 541 to control the motion of a corresponding valve 501, 502. The seating surface 412 of the helical torsion valve spring assembly 400 seats on surface 530 of the cylinder head 520, and the locating features 416, 417 interface with cylindrical features 525, 526 of the cylinder head 520 to achieve precise location and to prevent undesirable sideways motion of the helical torsion valve spring assembly 400. A retainer 515, 516 is fastened to each valve 501, 502 in a conventional way having two keepers 513 contacting a retainer 515, 516 and a keeper groove 509, 510 of each valve 501, 502. Force from each helical torsion spring pair 420-421, 440-441 biases a valve 502, 501 towards a closed position such that a seat face 504, 503 contacts a valve seat 528, 527 of the cylinder head 520.

As shown in FIGS. 18-26, each retainer 516, 515 has a flat surface 536, 535 that contacts the convex surfaces 426-427, 446-447 of the moving legs 424-425, 444-445 of the helical torsion spring pairs 420-421, 440-441 to couple the reciprocating-rotary motion of the moving legs 424, 425, 444, 445 with the reciprocating-linear motion of the retainers 516, 515 in such a way that allows for acceptable contact pressures at the interface there between.

Figure 23:
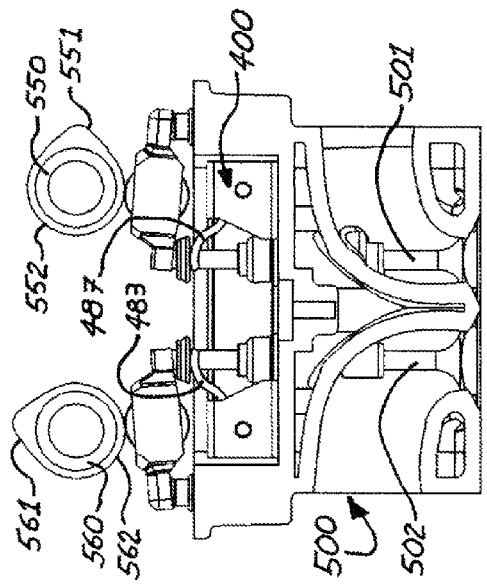
FIG. 23 is another isometric cross-sectional view of FIG. 21.

FIG. 23 is another isometric cross-sectional view similar to FIG. 21, and FIGS. 24-26 are side views of FIG. 21.

Figure 24:
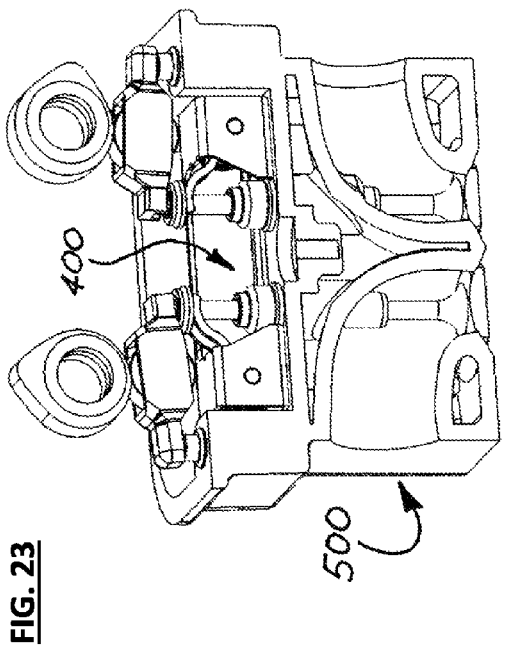
FIG. 24 is a side cross-sectional view of FIG. 23.

FIG. 24 shows the base circles 562, 552 each contacting a roller 543 to cause the corresponding intake and exhaust valves 502, 501 to be in the closed position. The two visible helical torsion springs 421, 441 are in the valve-closed state 483, 487.

Figure 25:
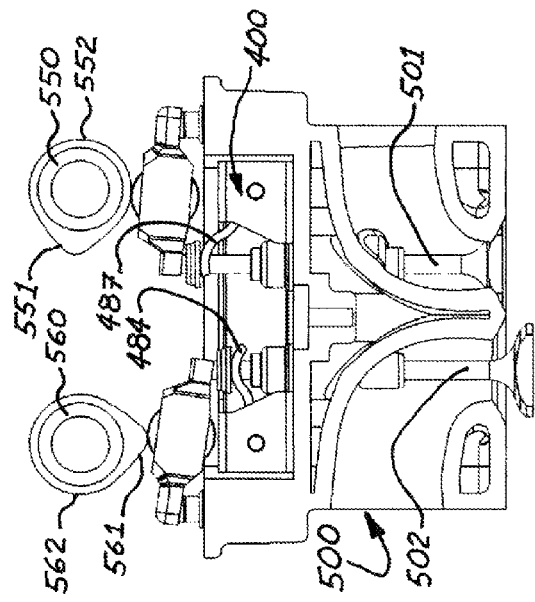
FIG. 25 is another side cross-sectional view of FIG. 23 showing the exhaust cam lifting the exhaust valve.

In FIG. 25, the cam lobe 551 is now contacting a roller 543 to cause the exhaust valve 501 to be in the open position and the helical torsion spring 441 to be in the valve-open state 488, while the base circle 562 is contacting a roller 543 to cause the intake valve 502 to be closed with the helical torsion spring 421 being in the valve-closed state 483.

Figure 26:
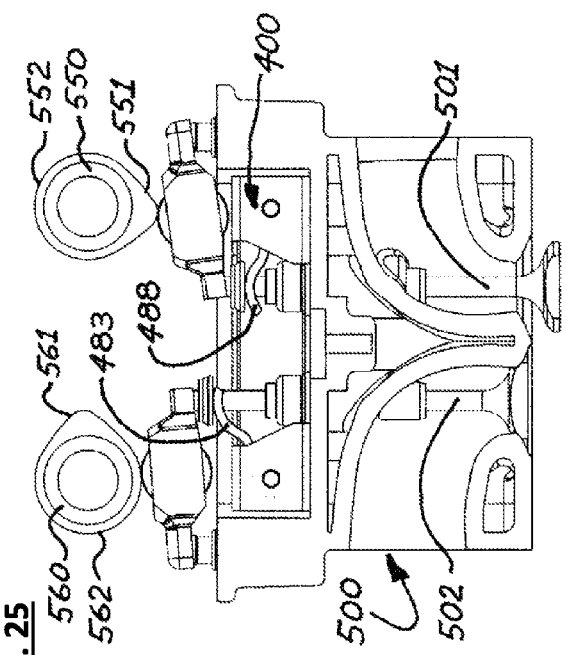
FIG. 26 is another side cross-sectional view of FIG. 23 showing the intake cam lifting the intake valve.

In FIG. 26, the cam lobe 561 is now contacting a roller 543 to cause the intake valve 502 to be in the open position and the helical torsion spring 421 to be in the valve-open state 484, while the base circle 552 is contacting a roller 543 to cause the exhaust valve 501 to be closed and the helical torsion spring 441 to be in the valve-closed state 487.

FIGS. 27(a-e) are partial isometric cross-sectional views of the upper section of FIG. 21 showing the sequence of steps for installing a valve spring retainer 515 to couple the helical torsion valve spring assembly 400 to exhaust valve 501 in accordance with a method of the invention. In the illustrated method, the installation of a retainer 515 is described. The engine valvetrain 500 shown is partially completed with the intake and exhaust valves 501, 502, valve stem seals 512 and helical torsion valve spring assembly 400 already in place, and having retainer 516 already installed onto intake valve 502. It will be appreciated that installing a retainer 515 onto exhaust valve 501 is discussed herein, however the principles of the invention can also be applied to installing retainer 516 onto intake valve 502.

Figure 27B:
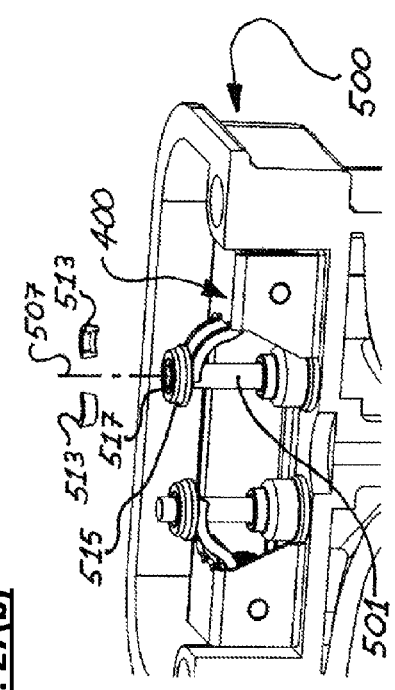
FIGS. 27(a-e) are enlarged, partial isometric cross-sectional views of FIG. 23 showing the sequence of steps for installing a valve spring retainer in accordance with a method of the invention.
Figure 27A:
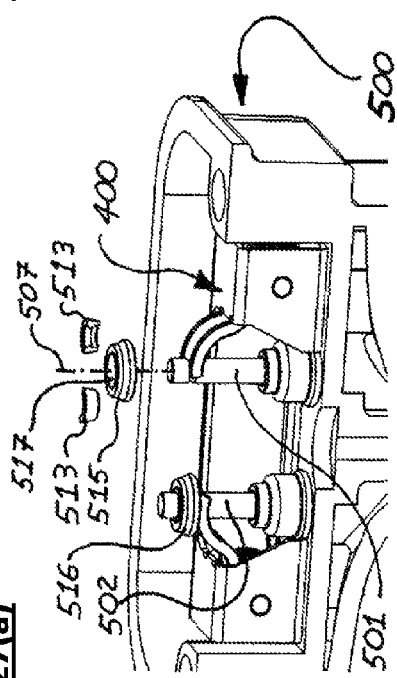

First, a retainer 515 is positioned above exhaust valve 501 with the axis 507 of exhaust valve 501 being substantially aligned with a hole 517 of retainer 515, as shown in FIG. 27(a).

Figure 28:
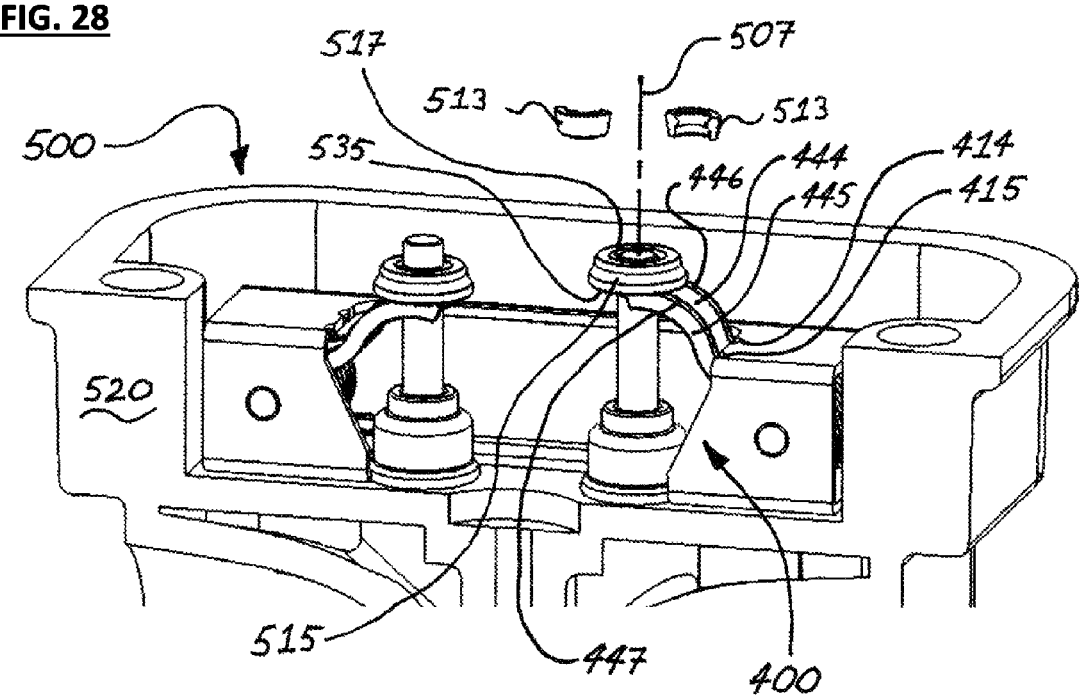
FIG. 28 is an enlarged view of FIG. 27(b)

Next, as shown in FIG. 27(b) and FIG. 28, an enlarged version of FIG. 27(b), the retainer 515 surrounds axis 507 and stem 505 of valve 501, and flat surface 535 of retainer 515 contacts convex surfaces 446, 447 of moving legs 444, 445 of helical torsion springs 440, 441. The moving legs 444, 445 each contact a spring contact surface 414, 415 of the frame 401. One aspect of the invention is that the moving legs 444, 445 of the helical torsion spring assembly 400 are in the statically loaded state 486 while in contact with spring contact surfaces 414, 415 of the frame 401. This enables the retainer 515 to be easily placed around axis 507 and stem 505 of exhaust valve 501 in a single straight-line motion to contact the convex surfaces 446, 447, and without the need for the installer to engage the helical torsion springs 440, 441

Figure 27D:
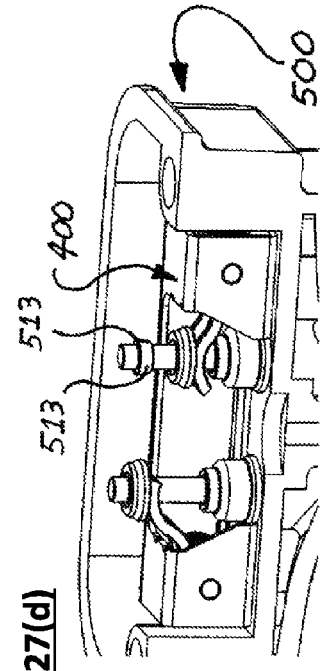
Figure 27C:
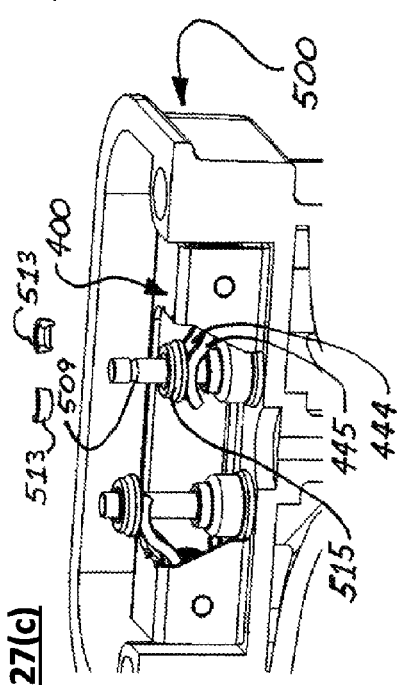
Figure 27E:
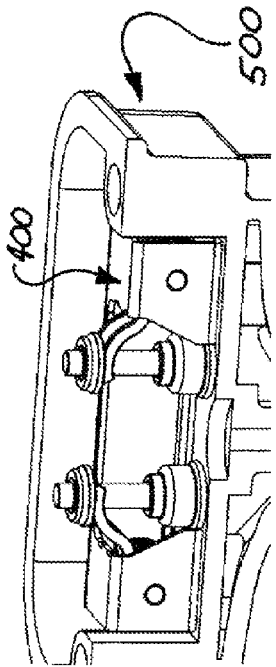

Next, as shown in FIG. 27(c), the installer applies force to push the retainer 515 down farther around the stem 505 of the exhaust valve 501, thereby displacing moving legs 444, 445 out of contact with spring contact surfaces 414, 415 of the frame 401 and leaving keeper groove 509 exposed above the retainer 515. Next, as shown in FIG. 27(d), the two keepers 513 are installed in keeper groove 509 of valve 501 with retainer 515 held farther down the stem 505. FIG. 27(e) shows both retainers 516, 515 installed with helical torsion springs 421, 441 being in the valve-closed state 483, 487 and the other helical torsion springs 420, 440 being in a likewise condition. All of the moving legs 424-425, 444-445 are out of contact with the frame 401 such that the force from each torsion spring pair 420-421, 440-441 is acting to bias valves 502, 501 into the closed position. This process for installing a retainer 515 onto a valve 501 applies to all of the helical torsion valve spring assemblies 100, 200, 300, 400, 700 discussed herein.

Hence, the helical torsion valve spring assembly 100, 200, 300, 400, 700 of the invention enables conventional processes for installing a helical torsion valve spring assembly 100, 200, 300, 400, 700 onto a cylinder head 520, 820 of an engine valvetrain 500, 800, and for installing a retainer 515, 516, 815, 816 onto a valve 501, 502, 801, 802. These processes are essentially the same as those for conventional helical-compression-type valve springs. Thus, the functional improvements associated with helical torsion valve springs 420, 421, 440, 441, 720, 740 can be realized with no undesirable aspects during the assembling or servicing of the engine valvetrain 500, 800, and to avoid damage to an engine component, and also with regards to the safety of the engine builder.

Figure 29:
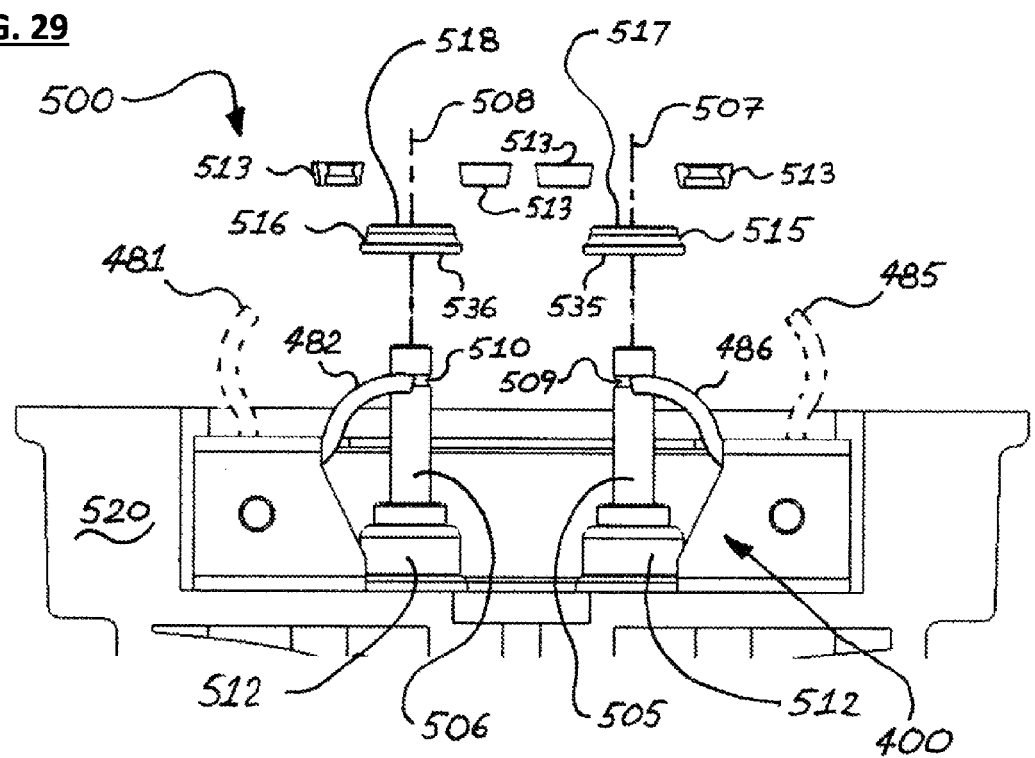
FIG. 29 is an enlarged, partial exploded side cross-sectional view of FIG. 21 showing two of the helical torsion springs in a statically loaded state and a free state (in phantom)

FIG. 29 is an exploded-partial-side view of FIG. 21 showing two helical torsion springs 421, 441 in a statically loaded state 482, 486 and a free state 481, 485 in phantom. This illustrates the advantages associated with having torsion springs 420-421, 440-441 held in a statically loaded state 482, 486 in the helical torsion valve spring assembly 400 of the invention in order to facilitate easy and safe installation of the retainers 515, 516. One can realize that should an attempt be made to install helical torsion valve springs 420-421, 440-441 starting from the free state 481, 485 position it would require two coordinated motions—one for moving the spring legs 424-425, 444-445 in first a sideways and then a downwards direction, and second for pushing the retainer 515, 516 down around the valve stem 505, 506. This process is more complicated and liable to result in damage to an engine component or possibly an accident of some kind—or could necessitate a larger, heavier retainer 515, 516. It is an object of this invention to facilitate safe and easy installation of retainers 515, 516 to aid assembly of engines and servicing of engines. Furthermore, it can be realized that having the moving legs 424-425, 444-445 very close to the valve stems 505, 506 enables use of the smallest diameter for the retainer 515, 516, which benefits the function of the valvetrain by minimizing the reciprocating mass. Also, having moving legs 424-425, 444-445 precisely held in spring contact surfaces 418-419, 414-415 can enhance the installation of valves 505, 506 into the cylinder head 520 after the helical torsion valve spring assembly 400 has been installed onto the cylinder head 520.

Referring to FIGS. 30 through 34, a helical torsion valve spring assembly 700 contains two helical torsion springs 720, 740 which are intended for applying a biasing force to a single valve of an engine valvetrain, is shown according to another embodiment of the invention. FIG. 30 is an exploded view that shows details including the frame 701, which can be made from a single sheet metal stamping using conventional manufacturing processes. The frame 701 includes a pair of opposing side walls 706, 708, which each have a top wall 709, 710 and each connect to a bottom wall 711. The top walls 709, 710 are located in diagonally opposite corners of the frame 701 and each has a spring contact surface 713, 714, in the form of a notch, and the like. Bottom wall 711 has opening 715, locating feature 716 and a seating surface 712 on the underside.

Side walls 706, 708 contain two pairs of holes 705-704, 703-702 which each interface with a shaft 770, 771 that is surrounded by a bushing 760, 761, and having a helical torsion spring 720, 740 surrounding each bushing 760, 761, all of which are captured inside the frame 701. The shafts 770, 771 can be secured by an interference fit with the holes 705-704, 703-702.

Each helical torsion spring 720, 740 has a coil 728, 748, a stationary leg 722, 742 which has a bottom surface 723, 743 which contacts a surface 773, 772 on the opposite shaft 771, 770, as shown in FIG. 34. Each stationary leg 722, 742 is captured in between the end surface 763, 762 of a bushing 761, 760 and the inner surface 718, 717 of a side wall 708, 706. Each helical torsion spring 720,740 also has a moving leg 724, 744 which contacts a spring contact surface 713, 714 of the frame 701 so that each helical torsion spring 720, 740 is precisely held in a statically loaded state to enhance the installation process of a valve spring retainer 815, 816 of an engine valvetrain 800, as shown in FIGS. 35-42, in the same way as previously described for helical torsion valve spring assembly 400 in engine valvetrain 500. The moving leg 724, 744 of each helical torsion spring 720, 740 has a convex surface 726, 746 which is intended to be the loaded interface as it is used in service. The helical torsion valve spring assembly 700 is shown in isometric view in FIG. 31, in a top-hidden-line view in FIG. 32, in end view in FIG. 33, and in side-hidden-line view in FIG. 34.

An axis 719 extends between side walls 706, 708 through opening 715, as shown in FIGS. 31-32 and FIG. 34, where it can be seen that the moving legs 724, 744 of the helical torsion springs 720, 740 are on opposite sides of axis 719, and shafts 770, 771 are also on opposite sides of axis 719. As used in service, axis 719 is intended to align with the axis 807, 808 of a valve 801, 802, as described below. Frame 701 protects the spring coils 728, 748, which are highly-stressed during use. It can also be realized that each end of frame 701 can be covered by an additional part to provide further protection.

FIGS. 35-38 show an engine valvetrain 800 with a plurality of helical torsion valve spring assemblies 700 according to an embodiment of the invention. Specifically, FIG. 35 shows an engine valvetrain 800 that is typical for one bank of a V-8 engine having a pushrod-type valvetrain, except the engine valvetrain 800 contains eight helical torsion valve spring assemblies 700. FIG. 37 is an enlarged cross-sectional view of a single-cylinder group of the engine valvetrain 800 of FIG. 36. However, it will be appreciated by one skilled in the art that the invention is not limited by the number of helical torsion valve spring assemblies 700 that are included in the engine valvetrain 800, and the invention can be practiced with any desirable number of helical torsion valve spring assemblies 700.

Figure 38:
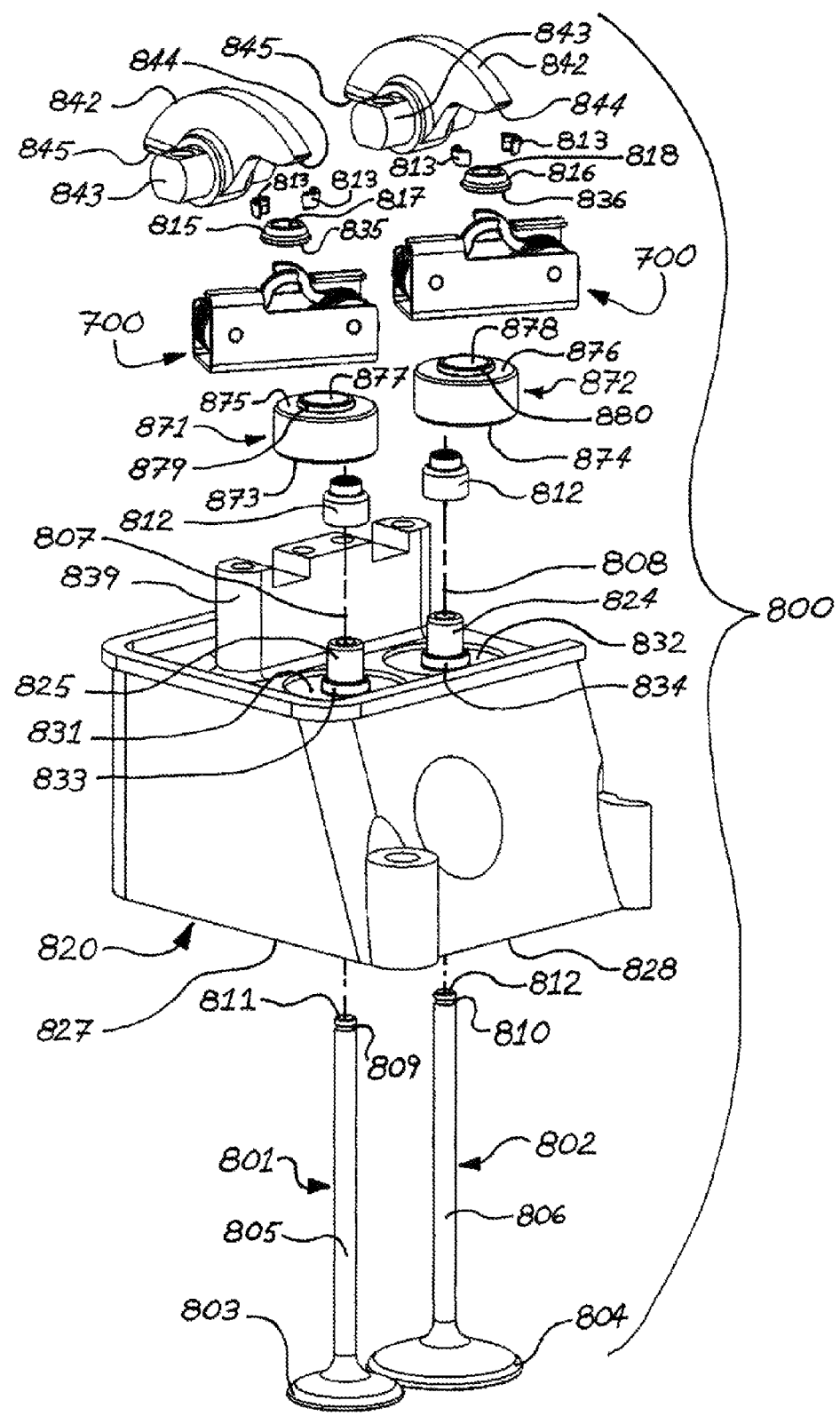
FIG. 38 is an exploded view of FIG. 37.

FIG. 38 is an exploded view of FIG. 37 showing one cylinder section of the engine valvetrain 800 revealing a cylinder head 820, an exhaust valve 801 and intake valve 802 each of which has a seat face 803, 804, a stem 805, 806, a keeper groove 809, 810 and an axis 807, 808 with each valve 801, 802 coaxially mounted in valve guides 825, 824 of cylinder head 820. A valve stem seal 812 is coaxially mounted on each valve guide 825, 824 and contacts a valve stem 805, 806. The valve tip 811, 812 of each valve 801, 802 contacts a valve tip pad 844 of a rocker arm 842 that has a ball-socket 845 and that is rotatably coupled to a fulcrum 843 that is fixed to an extension 839 of cylinder head 820 such that reciprocating-rotary motion of a rocker arm 842 can cause opening and closing of an exhaust valve 801 or intake valve 802. A pedestal 871, 872 has a bottom surface 873, 874 that seats against a flat surface 831, 832 of cylinder head 820, and a round hole 877, 878 which interfaces with a cylindrical surface 833, 834 of cylinder head 820 to prevent sideways motion. A seating surface 712 of a frame 701 of a helical torsion valve spring assembly 700 seats against the top flat surface 875, 876 of a pedestal 871, 872, and has a locating feature 716 interfacing with outside round surface 879, 880 of a pedestal 871, 872 to prevent sideways motion and to align a valve axis 807, 808 with axis 719. A retainer 815, 816 is attached to each valve stem 805, 806 in the conventional way having a pair of keepers 813 engaging a keeper groove 809, 810 of each valve 801, 802. The convex surfaces 726, 746 of both helical torsion springs 720, 740 of a helical torsion valve spring assembly 700 contact the bottom flat surface 835, 836 of a retainer 815, 816 to apply force to bias a valve 801, 802 towards the closed position such that a seat face 803, 804 contacts a valve seat 827, 828 of cylinder head 820. The axis 807, 808 of each valve 801, 802 is essentially aligned with axis 719 of a helical torsion valve spring assembly 700 such that a pair of moving spring legs 724, 744 are on opposite sides of the stem 805, 806 of a valve 801, 802, as shown in FIG. 37.

Convex surfaces 726, 746 of moving legs 724, 744 of helical torsion springs 720, 740 contact the flat surface 836, 835 of a retainer 816, 815 to couple the reciprocating-rotary motion of the moving legs 724, 744, which angularly displace about the axis of a bushing 761, 760 during a valve lift event, with the reciprocating-linear motion of a retainer 815, 816, which is coupled to a valve 801, 802, in a way that allows for acceptable contact pressures at the contact interface.

FIGS. 39 and 41 are additional views of the engine valvetrain 800, and also include the lower valvetrain components including a camshaft 901, which has exhaust and intake cam lobes 913, 914, each associated with a base circle 911, 912, and having lifters 931, 932 which intermittently contact either a base circle 911, 912 or a cam lobe 913, 914. Pushrods 941, 942 each engage a lifter 931, 932 in a conventional way and at the other end engage a ball socket 845 of a rocker arm 842 such that rotary motion of the camshaft 901 causes the valves 801, 802 to be intermittently lifted.

In FIG. 39, each lifter 931, 932 contacts a base circle 911, 912, hence both exhaust and intake valves 801, 802 are closed such that seat faces 803, 804 each contact a valve seat 827, 828.

In FIG. 41, lifter 932 is now contacting cam lobe 914 causing intake valve 802 to be open such that seat face 804 is no longer contacting valve seat 828.

FIGS. 40 and 42 are partial-side-hidden-line views showing only certain components from FIGS. 39 and 41, respectively: the intake valve 802, valve guide 824, pedestal 872, valve stem seal 512, helical torsion valve spring assembly 700, retainer 816 and keepers 813.

In FIG. 40, which is a partial view of FIG. 39, the intake valve 802 is closed, and the moving legs 724, 744 of the helical torsion valve spring assembly 700 are contacting the flat surface 836 of the retainer 816.

In FIG. 42, which is a partial view of FIG. 41, the intake valve 802 is now open, and the moving legs 724, 744 of the helical torsion valve spring assembly 700 are contacting the flat surface 836 of the retainer 816 and can be seen having been displaced in response to the intake valve 802 being lifted.

A further advantage of this configuration can be realized if the helical torsion springs 720, 740 are identical and are mounted around shafts 770, 771 which are parallel and equidistant from axis 719, and having moving legs 724, 744 equidistant from axis 719. Using this arrangement, zero side-loading on the valve stem during the valve lift event will result because the frictionally-induced forces in the transverse direction are equal and opposite to cancel each other out. Furthermore, forces that are applied normal to the flat surface 835, 836 of a retainer 815, 816, at any time during the valve lift event, are at two points which are equidistant from, and on opposite sides of, a valve axis 807, 808 such that the net loading on a retainer 815, 816 is precisely centered on the valve axis 807, 808. Hence, a biasing force to a valve 801, 802 can be applied while incurring zero side loading to a valve 801, 802 to help minimize wear at the interface of a stem 805, 806 and valve guide 825, 824 and to reduce friction. Conversely, a helical-compression-type valve spring that is mounted coaxially with a valve 801, 802, due to having its active coil terminating at a point offset from the valve axis 807, 808, incurs offset force application into a retainer 815, 816 that results in loading at the stem 805, 806 and guide 824, 825 interface.

The arrangement shown in FIGS. 35-38 shows each helical torsion valve spring assembly 700 mounted on a pedestal 871, 872, which enables one helical torsion valve spring assembly 700 design to be applied to exhaust and intake valves 801, 802 having different valve lift or spring force requirements by adopting different sizes of pedestals 871, 872. Likewise, this arrangement allows the same helical torsion valve spring assembly 700 to be applied to different engines, as well. However, it can be appreciated by one skilled in the art that a bottom extension can be added to the frame 701 such that the seating surface 712 is offset from the bottom wall 711 to eliminate the need for the pedestal. This principle also applies to all of the helical torsion valve spring assemblies 100, 200, 300, 400, 700 discussed herein. It can also be realized that while the frame 801 is stamped-metal type of construction, a similar structure can be manufactured by machining a section of rectangular tubing similar to frames 301, 401 which were previously described.

It should be noted that the helical torsion valve spring assembly 700 as shown in engine valvetrain 800 is not constrained from rotating about axis 719. However, the frictional hold torque between the seating surface 712 of the frame 701 and the top surface 875, 876 of the pedestal 871, 872 can be expected to exceed the torque generated by the two springs 720, 740 during a valve lift event because the contact radius of the pedestal 871, 872 is larger than the retainer 815, 816. Hence, the frame 701 can remain stationary during operation. This same principle applies to helical torsion valve spring assemblies 100 and 200. It can also be realized that anti-rotation features can be implemented to prevent undesired rotation.

One can realize that bushing 760, 761, and other bushings previously described, can be eliminated by increasing the outside diameter of shafts 770, 772 such that they provide a mounting surface for helical torsion springs 720, 740. One can also realize that while stationary legs 422-423, 442-443 of helical torsion springs 420-421, 440-441 are shown contacting bottom wall 411 of frame 401, the same essential result can be achieved by having a stationary leg 422-423, 442-443 contacting a top wall 409, 410 or any other feature of the assembly 400 that grounds a stationary leg 422-423, 442-443 to the frame 401 either directly or indirectly. One can also realize that while frame 401 has top walls 409, 410 with spring contact surfaces 418, 419, 414, 415 for mounting the moving leg 424, 425, 444, 445 of a helical torsion spring 420, 421, 440, 441, it is possible replace a top wall with an additional part attached to the frame to provide the same feature. One can also realize that while seating surface 412 for contacting a cylinder head 520 is part of the bottom wall 411 of frame 401, it is possible to eliminate the bottom wall 411 and have the edge of a side wall 406, 407, 408 form a seating surface 412 to achieve the same result. Furthermore, while the engine valvetrain 500 described herein has a single seating surface 412 of the bottom wall 411 of a frame 401 contacting a single surface 530 of the cylinder head 520, it can be realized that a plurality of contact interfaces between a frame 401 and a cylinder head 520 can be used to achieve the same result. These principles apply for all helical torsion valve spring assemblies 100, 200, 300, 400, 700 discussed herein.

While the invention has been specifically described in connection with various embodiments thereof, it is to be understood that this is by way of illustration and not of limitation, and the scope of the appended claims should be construed as broadly as the prior art will permit.

What is claimed is:

1. A helical torsion valve spring assembly, comprising:
a frame including a pair of opposing side walls, a top wall, and a seating surface, and having an axis extending between the pair of opposing side walls;
a first shaft and a second shaft, the first shaft and the second shaft each being received in and mounted to the frame, the mounted first shaft and the mounted second shaft being on opposite sides of the axis;

a first helical torsion spring having a first stationary leg and a first moving leg extending from a first coil, the first coil being mounted in the frame so as to surround the first shaft and be disposed intermediate the pair of opposing side walls; and a second helical torsion spring having a second stationary leg and a second moving leg extending from a second coil, the second coil being mounted in the frame so as to surround the second shaft and be disposed intermediate the pair of opposing side walls, wherein the first moving leg of the first coil and the second moving leg of the second coil are disposed on opposite sides of the axis, wherein at least one of the first helical torsion spring with the first coil and the second helical torsion spring with the second coil is in a statically loaded state when mounted within the frame, wherein the first moving leg of the first helical torsion spring engages the first top wall in the statically loaded state, wherein the helical torsion valve spring assembly is configured to provide a biasing force to a valve spring retainer of the engine valvetrain, and wherein the first stationary leg of the first helical torsion spring engages the second shaft in the statically loaded state.

2. The assembly of claim 1, wherein the frame further comprises a second top wall, and wherein the second moving leg of the second helical torsion spring engages the second top wall to be in a statically loaded state.

3. The assembly of claim 1, wherein the first shaft and second shaft are parallel to each other and are equidistant from the axis, and wherein the first moving leg and the second moving leg of the first helical torsion spring and the second helical torsion spring, respectively, are equidistant from the axis.

4. The assembly of claim 1, wherein the first moving leg of the first helical torsion spring includes a convex surface.

5. An engine valvetrain, comprising:
a cylinder head;
one or more valve guides, each valve guide coaxial with a valve seat of the cylinder head;
a valve having a valve stem, an axis and a seat face, the valve stem disposed through the valve guide;
a valve spring retainer surrounding the axis of the valve; and
a helical torsion valve spring assembly mounted on the cylinder head, the helical torsion valve spring assembly comprising:
a frame including a pair of opposing side walls, a top wall, and a seating surface;
a first shaft received into the frame; and
a first helical torsion spring having a coil, a stationary leg, and a moving leg, the coil being mounted within the frame so as to surround the first shaft, the stationary leg extends out from the coil at a first end of the coil and the moving leg extends out from the coil at a second end of the coil,
wherein the moving leg of the first helical torsion spring engages the top wall in a statically loaded state, and
wherein the helical torsion valve spring assembly is configured to provide a biasing force to the valve spring retainer.

6. The engine valvetrain of claim 5, further comprising a plurality of helical torsion springs mounted in the frame in the statically loaded state.

\* \* \* \* \*